UNITED STATES PATENT OFFICE.

WALTER AMES RULLMAN, OF RED BANK, NEW JERSEY.

CEREAL PREPARATION.

1,163,175.   Specification of Letters Patent.   Patented Dec. 7, 1915.

No Drawing.   Application filed May 13, 1915. Serial No. 27,746.

*To all whom it may concern:*

Be it known that I, WALTER AMES RULLMAN, a citizen of the United States, and a resident of Red Bank, county of Monmouth, and State of New Jersey, (whose post-office address is 74 West Front street, Red Bank,) have invented a certain Cereal Preparation, of which the following is a specification.

The object of my invention is to provide a suitable cereal which is nourishing, and easily digested, comprising substantially 75% of nutritive elements in the form of starch, maltose, and dextrin, and 25% residue comprising bran with agar-agar incorporated therein.

The preferred method of preparing my improved cereal is as follows: Primary grain products such as barley grains and wheat grains, and agar-agar are separately cleaned and treated until mixed as hereinafter set forth. Both the barley grains and wheat grains are placed in separate steep tanks with water for forty-eight hours, when the water is drained off and the grain, without mixing, is heaped in separate piles to about fourteen inches, and there allowed to remain until it begins to dry and sprouting commences. During this stage, the barley and wheat are aerated at intervals, so that the heat resulting from germination does not become too high. As the sprouting requires about five days, these grains remain in these piles during this time, and whenever required, to prevent the grains from becoming too dry, water is sprinkled upon them. After germination has occurred, the rootlets are cleaned out and the malt to one-half of the weight of the wheat, which is subsequently to be added, is crushed and mixed with water at about a temperature of 100° F. for one hour. The extract of malt is then extracted from the husk by a firm pressure. The whole wheat grains, which have been germinated for about five days, are ground to a pulp, thus giving a minute quantity of diastase with the starch of wheat and approximately 5% residue in the form of finely ground bran. To the wheat pulp is then added the malt extract from the germinated malt, which quantity of malt is one-half the weight of the wheat when the malt is in the form of barley. This extract of malt and whole ground wheat pulp are intimately mixed and sufficient water added to form a pasty mass. This mixture is then submitted to a temperature of 100° F. for one hour and about 153° F. for about fifteen minutes, and 156° F. for fifteen minutes. The mixture is stirred at all these temperatures. During the stage of heating at 153° F. and 156° F. dextrinization of a part of the starch occurs, when it is converted into maltose and dextrin. The mixture is then heated to 165° F. for fifteen minutes and then add agar-agar to 20% of the bulk and allow this mass to remain at the latter temperature for thirty minutes, during which time the agar-agar, which is of itself an ungelatinized substance, becomes gelatinized and becomes incorporated in the mass to a large degree. Agar-agar is a sea weed which comes in dried form, something like straw. It is cleaned and then reduced to a granular form and is thereafter used as above set forth. This gives a 25% residue in the form of bran and agar-agar, comprising approximately $3\frac{3}{4}$ per cent. bran, and $21\frac{1}{4}$ per cent. agar-agar. The heating is then discontinued and the mass allowed to cool. Salt and yeast are then added and the mass is allowed to stand for twelve hours. It is then transferred to baking pans and baked until dry and crisp. The product is then cooled and placed in a mill and reduced to a granular size, so as to be a cereal in dry form composed of 75% nutritive elements in the form of starch, maltose and dextrin and 25% residue of bran and agar-agar.

While I have described one embodiment of my invention, and the process of making the same, it is to be understood that my invention is not limited thereto, but is broad enough to cover all preparations that come within the scope of the annexed claims.

What I claim is:

1. A food product comprising a cereal and agar-agar.

2. A food product comprising a cereal and agar-agar commingled in granular form.

3. A food product comprising a cereal and agar-agar, in which the agar-agar has been gelatinized and caused to adhere to the cereal, and dried.

4. A food product comprising a cereal and de-gelatinized agar-agar, dried, granulated and commingled.

5. A cereal composed of substantially 75% nutritive elements and 25% bran and agar-agar.

6. A cereal containing 25% residue in the form of bran and agar-agar.

7. A food product containing starch, maltose, dextrin, salt, bran and agar-agar.

8. A cereal composed of grain products and agar-agar.

9. A cereal composed of grain products and agar-agar in granular form and commingled.

10. A cereal composed of grain products and agar-agar, in which the agar-agar has been gelatinized and commingled with the cereal and dried.

11. A food product comprising a bran and agar-agar.

12. A food product comprising a primary grain product, bran and agar-agar.

Signed at the city of Red Bank, county of Monmouth, and State of New Jersey, this eighth day of May, 1915.

WALTER AMES RULLMAN.